(No Model.)

P. LORD.
SAW FILE.

No. 603,909. Patented May 10, 1898.

WITNESSES:
J. Brainerd Hall
L. C. Baldwin

INVENTOR:
Peter Lord,
by F. A. Cutter,
atty.

UNITED STATES PATENT OFFICE.

PETER LORD, OF WORCESTER, MASSACHUSETTS.

SAW-FILE.

SPECIFICATION forming part of Letters Patent No. 603,909, dated May 10, 1898.

Application filed July 31, 1897. Serial No. 646,575. (No model.)

*To all whom it may concern:*

Be it known that I, PETER LORD, a citizen of the United States, residing at Worcester, in the county of Worcester and State of Massachusetts, have invented certain new and useful Improvements in Saw-Files, of which the following is a full, clear, and exact description.

My invention relates to files employed for sharpening saws; and it consists, essentially, of a body having indented or cut file-like corrugations or ribs thereon, all as hereinafter more fully set forth and especially claimed.

The object of my improvement is to provide a tool of the class designated above which will sharpen a saw more quickly and accurately than those in common use and without requiring the degree of skill necessary for such work by ordinary means. It is extremely difficult with the regular three-cornered file to sharpen the teeth of a saw evenly, so as to leave them true and of exactly the same height, and it is to overcome these difficulties that I have produced my invention.

That my invention may be seen and fully understood by those skilled in the art, reference will be had to the following specification and annexed drawings, forming a part thereof, in which—

Figure 1:
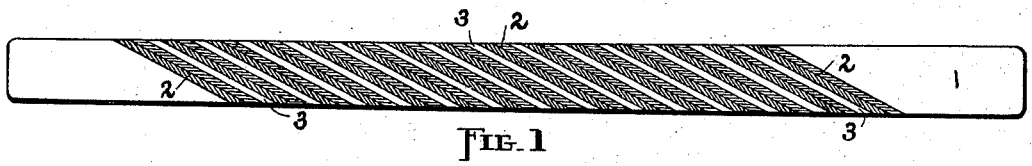
Figure 2:
Figure 3:
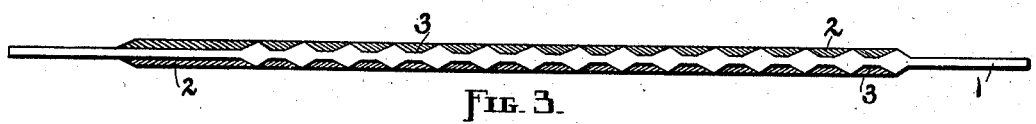

Figure 1 is a side view of my file; Figs. 2 and 3, edge views, and Fig. 4 an enlarged cross-section showing the same in operative relation to a saw.

Similar figures of reference designate like parts in the drawings and specification.

The flat body 1 of the file is provided on each side with the angular corrugations or ribs 2. Each rib 2 corresponds to two sides of a three-cornered file. These ribs are preferably located on the body 1 at an angle with said body corresponding to the angle of the beveled or cutting edge of a saw-tooth. This angular direction of the ribs 2 permits the file to be held at right angles to the saw instead of at an acute angle, as with a common file, and thereby enhances the accuracy of the operation, since it is easier to maintain the proper relative position of such a file to the saw than it is that of the common file to the saw. Both sides of each rib 2 are cut like an ordinary file. The spaces 3 between adjacent ribs 2 are sufficiently wide to receive two saw-teeth between each pair of said ribs and deep enough to allow clearance for the points of said teeth.

Figure 4:
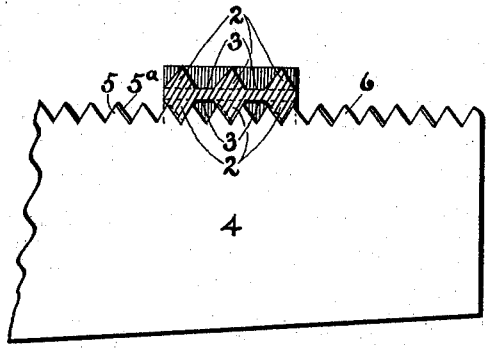

In Fig. 4 the saw 4 is shown having the teeth 5 and 6 and a section of my file applied thereto for the better illustration of the operation of my invention, which is as follows: The saw 4 being secured in an upright position by means of a vise or otherwise, with its handle (same not shown) to the left, brings the rib 2 on the under side of the body 1 into contact with the teeth 5 and 6, with the left sides of said ribs bearing against the beveled edges $5^a$ of the teeth 5 and the right sides of said ribs against the rear edges of the teeth 6. Now move the body 1 forward and back, as in ordinary filing. The peculiar arrangement of the ribs 2 in relation to the body 1 not only enables one to hold said body at right angles to the saw 4, but causes the file to travel to the right when pushed forward, the interstices or spaces 3 serving as ways or guides for the teeth 5 and 6. The body 1 is reciprocated until the teeth 5 within the limit of the lateral movement of said body are sufficiently sharpened, when the file is moved to the right and a new section of the saw similarly treated. This operation is repeated until all of the teeth 5 are sharp, when the saw 4 is reversed, the body 1 turned over, and the teeth 6 are operated on in precisely the same manner as were the teeth 5, the lateral movement of the file when pushed forward being to the left, however, instead of to the right, as before.

The pitch of the sides of the ribs 2 is the same as that of the teeth when perfect. Hence the front or cutting edges of said teeth are all filed alike by one set or corresponding sides of said ribs, while the opposite sides true up the back edges of the teeth. The length of this file, together with the large amount of bearing-surface afforded by its peculiar construction, add materially to its efficacy and make it easy to maintain the necessary deviation from a horizontal to a slightly-inclined direction during the process of sharpening a saw.

For filing different kinds and sizes of saws it will be necessary to vary the pitch and angle of the ribs 2 in different tools to adapt the same for the work required of them.

What I claim as my invention, and desire to secure by Letters Patent, is—

1. The combination in a saw-file, of a flat body and a series of pointed, file-like ribs on said body arranged with spaces between said ribs equal in width to two adjacent saw-teeth and greater in depth than the length of said teeth, substantially as and for the purpose set forth.

2. The combination in a saw-file, of a flat body and a series of pointed, file-like ribs on the same arranged at an angle corresponding to the bevel of the cutting edge of saw-teeth, said ribs having spaces between them equal in width to two adjacent saw-teeth and greater in depth than the length of said teeth, substantially as and for the purpose set forth.

In testimony whereof I affix my signature in presence of two witnesses.

PETER LORD.

Witnesses:
J. BRAINERD HALL,
F. A. CUTTER.